FREQUENCY-SHIFT RECEIVER INSENSITIVE TO DISTORTION AND SELECTIVE FADING
Filed Feb. 17, 1964
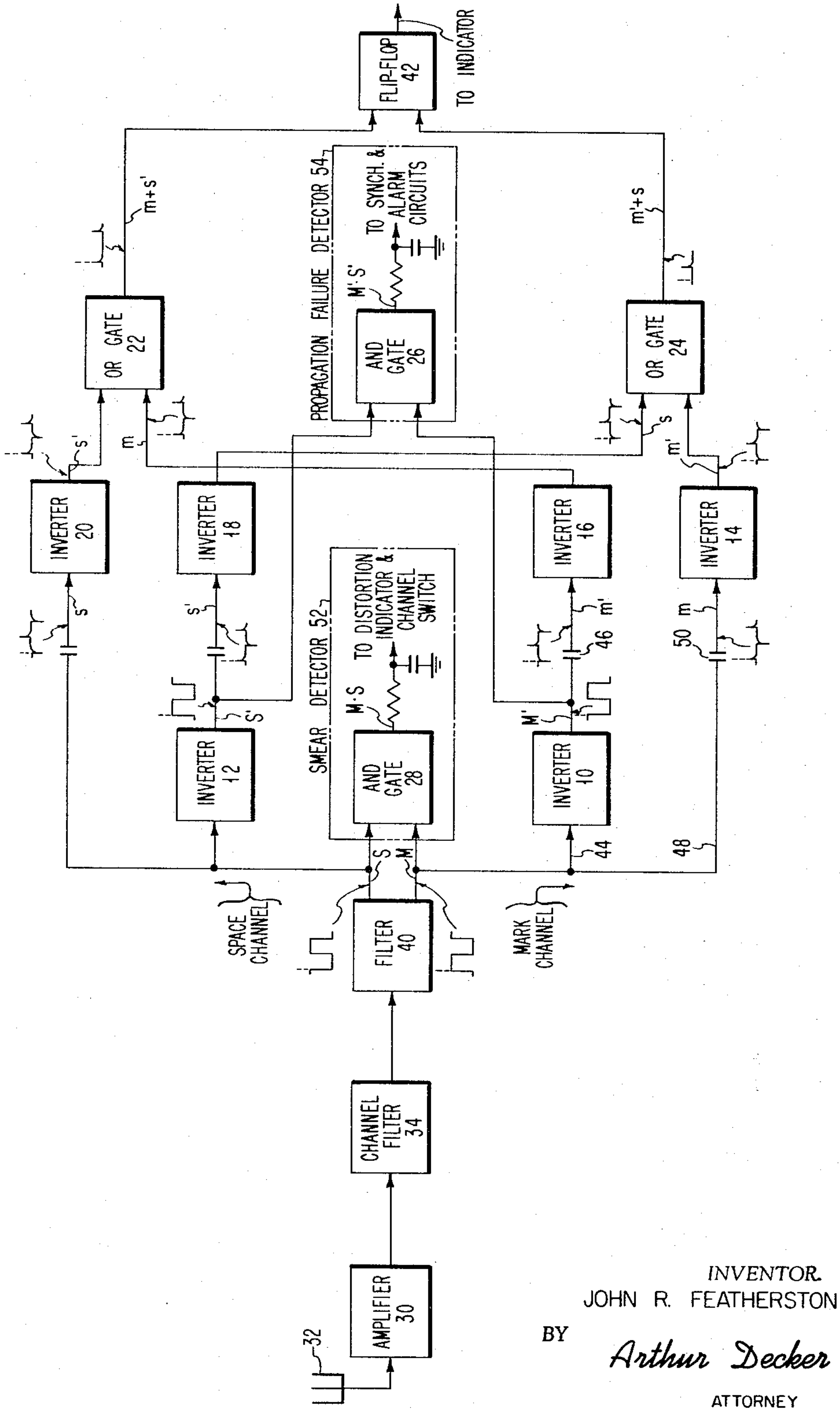
INVENTOR.
JOHN R. FEATHERSTON
BY Arthur Decker
ATTORNEY United States Patent Office 3,348,153
Patented Oct. 17, 1967

3,348,153
FREQUENCY-SHIFT RECEIVER INSENSITIVE TO DISTORTION AND SELECTIVE FADING

John R. Featherston, Tucson, Ariz., assignor to International Business Machines Corporation, New York, N.Y., a corporation of New York Filed Feb. 17, 1964, Ser. No. 345,234
8 Claims. (Cl. 325—320)

ABSTRACT OF THE DISCLOSURE

Presented is a binary FSK receiver having its IF channel separated into mark and space channels each feeding one of the complementary inputs of an RS flip-flop. In each channel, circuitry interconnects the channels as follows:

(1) A differentiator-inverter generates a pulse corresponding to the lack of the respective mark and space input signals.

(2) A serially connected inverter and differentiator-inverter generates signals corresponding to the complements of the respective mark and space input signals and pulses corresponding to the respective mark and space input signals.

(3) An OR gate receives both the output of circuit 1 and the pulses of circuit 2 to generate energization for one of the flip-flop inputs.

(4) A first AND gate receives the mark and space input signals and generates energization for a distortion indicator when they are coincident.

(5) A second AND gate receives the complements of the mark and space input signals generated by both circuits 2 and generates energization for synchronization and alarm circuits.

This invention relates to binary communications systems of the frequency shift keyed (FSK) type and, more particularly, in such a system, to a receiver capable of coping with problems caused by multipath transmission.

In FSK communications systems a wave of one frequency is transmitted to represent the "mark" of binary coding while a wave of another frequency is transmitted to represent the "space" of binary coding; one or the other of the frequencies is always transmitted, since one or the other bits of the coding is always present. Such systems are admirably suited for wire or cable and other applications in which mark and space waves are equally attenuated, but utility is severely limited in radio propagation in which selective fading is a problem. This phenomenon comprises interference due to the several transmission paths, which attenuate, by different amounts, signals of different frequencies. Typically, the mark signal may vary in amplitude by 30 db, while the space signal, which may differ from the former by only a few hundred cycles, will undergo amplitude variations uncorrelated in time with those of the mark signal. Severe distortion of the received data signal results and transmission thus becomes marginal and unreliable.

Conventional communications systems depend upon there being present at all times a signal at the receiver to operate its A.G.C. circuits or limiters, which compensate for attenuation variations in the signal caused by the transmission medium. The use of limiters in such conventional systems causes the channel to be highly non-linear, resulting in severe cross modulation between the mark and space signals when multipath spreading is present. The amplitude-limited signal is fed to filter networks or a discriminator to provide an output whose amplitude is dependent on the frequency of the signal. The result, for example, may be an output of +10 volts for the mark frequency, −10 volts for the space frequency and zero volts for noise only. This square-wave signal may then be differentiated and used to drive a bistable state decision circuit, such as a flip-flop, having a triggering threshold level at about zero volts; the state of the flip-flop thus indicates the transmitted binary coding. Under conditions of selective fading, however, there will be frequent periods when either the mark or space signal will fail to propagate through the medium. During these periods, the signal which does propagate will provide a differentiated signal which can trigger the flip-flop to only one of its states, since the signal generated when the non-propagating frequency is transmitted will not exceed the flip-flop threshold; the flip-flop state will thus not accurately indicate the transmitted binary coding.

A solution to the problem of selective fading in present practice utilizes diversity techniques in which two complete sets of mark and space signals, different in frequency, are generated in accordance with the binary coding. In the receiver, the outputs of both mark and both space channels are combined and then used to drive the flip-flop. Improvement in reliability is obtained in a diversity system because of the unlikelihood of two different mark frequencies or two different space frequencies simultaneously failing to propagate. It is evident that this system, however, is exceedingly wasteful of radio spectrum space, transmitter power and communications equipment.

It is thus an object of the present invention to provide increased reliability in a binary radio communications system not characterized by the aforementioned disadvantages.

The present invention accomplishes this object by recognizing that the basic FSK communications system is inherently diverse in nature, in that the mark signal and the space signal each convey the entire binary coding. The receiver to be described takes advantage of this characteristic and will be seen to provide correct binary output when only the mark or only the space signal is being received, or both are being received; i.e., one of the signals may fail to propagate entirely and despite this the receiver will generate a signal capable of triggering its bistable decision circuit properly.

High frequency radio communications is generally achieved over great distances,which contribute, for the signal, a plurality of paths between transmitter, and receiver. Multiple ionospheric and terrestrial reflections commonly cause variable delays for the pulses of the two signals of the FSK transmission, and a consequent coincident reception or lack of reception of both signals despite the fact that, at the transmitter, emission was at all times of only one of the signals. This phenomenon effectuates indefiniteness of the demarkation between the signals and, consequently, ambiguity at the receiver.

An object of this invention is to obviate this distortion of the received signal by means of digital combination of the mark and space signals only after both had been independently filtered, rectified and shaped into data signals. In that the means shown for doing this does not require that the mark and space signals be of comparable amplitude (as do conventional systems), the usual input limiter can also be dispensed with, thus removing the cause of the usual mark-space intermodulation.

It is another object of this invention to provide, in a binary communications receiver, a means capable of indicating distortion due to multipath propagation delays which effectuate the coincident receipt of both mark and space signals, and accordingly, to generate a signal for driving the receiver distortion indicator and channel switch.

A further object of this invention is to provide, in a receiver, a circuit capable of indicating simultaneous failure of both mark and space signals to propagate and accordingly, to generate a signal for driving the receiver synchronizing and alarm circuits.

The receiver circuitry which accomplishes these results is fed by the filter which separates the IF signal channel into mark and space channels. Combinations of inverter circuits, differentiating circuits and gates interconnecting the channels are then utilized to generate four pulse signals: one signal is generated when either the mark channel is energized or the space channel is de-energized and is used to trigger the decision flip-flop to one of its states; a second signal is generated when either the mark channel is de-energized or the space channel is energized and is used to trigger the decision flip-flop to the other of its states; a third signal is generated when both mark and space channels are energized and is used to feed the receiver distortion indicator and channel switch; and, the fourth signal is generated when both mark and space channels are de-energized and is used to feed the receiver synchronizing and alarm circuits. The circuit of the invention generates pairs of these four signals exclusively, i.e., when one of a pair is generated the other is not generated, and thus confusion of operation of the decision flip-flop is eliminated.

The foregoing and other objects, features and advantages of the invention will be apparent from the following more particular description of a preferred embodiment of the invention, as illustrated in the accompanying drawing.

The figure is a diagram of an FSK binary communications receiver embodying the present invention.

As shown, amplifier 30 receives both mark and space signals through antenna 32. Channel filter 34, responsive to the band for these signals, isolates them from other nearby RF signals. They are then separated from each other by filter 40, and appear in the mark and space channels, respectively. These signals, designated M and S, are bi-valued (square-wave) signals, signal M, for instance, rising to a specified D.C. level when the mark frequency is in the mark channel and otherwise at a specified lower D.C. level, and signal S, for instance, rising to the specified D.C. level when the space frequency is in the space channel and otherwise at the specified lower D.C. level. The channels generate signals for triggering the inputs of the receiver decision flip-flop 42 and, since their components and connections are similar, only the mark channel will be described. It will be noted in the description that identical designations are given for similar signals despite generation by different components.

In one leg 44 of the mark channel, signal M is complemented by inverter 10 to form signal M′, then differentiated by capacitor 46 operating with the input impedance of inverter 16 to form pulse signal $m'$, which, in turn, is inverted by inverter 16 to its complementary signal $m$. Signal $m$ comprises one input to space channel OR gate 22. In the other leg 48 of the mark channel, capacitor 50 operating with the input impedance of inverter 14 forms pulse signal $m$, which, in turn, is inverted by inverter 14 to its complementary signal $m'$. Signal $m'$ comprises one input to mark channel OR gate 24. The other inputs to OR gates 22 and 24 comprise signals $s'$ and $s$, respectively, generated in the space channel as should now be apparent. As a result of this combination of circuitry, the output of OR gate 24, pulse signal $m'+s$, is generated, and triggers flip-flop 42 to one state, whereas the output of OR gate 22, pulse signal $m+s'$ is generated, and triggers flip-flop 42 to its complementary state. Flip-flop 42 is consequently triggered although one of the FSK system frequencies is altogether lacking. As shown, the output of flip-flop 42 may serve to drive the receiver indicator for presenting the transmitted binary coding. The waveshapes shown associated with the signals in the figure correspond to FSK reception with negligible distortion and fading and are considered to be self-explanatory.

The problem of multipath propagation of signals differing in frequency has already been pointed out above as characterized, in the receiver, by simultaneous detection of both signals or by failure of detection of both signals. The present invention provides for each of these contingencies, the former with smear detector 52 and the latter with failure detector 54.

Smear detector 52 comprises AND gate 28, which responds to signals M and S to provide, at its output, signal M·S, a square-wave signal present only when signals M and S are coincident. Signal M·S may be integrated as shown and the resulting signal may be applied to the receiver distortion indicator and channel switch, which may be set to switch channel filter 34 to select a different set of FSK signals if distortion is excessive.

Failure detector 54 comprises AND gate 26 which responds to signals M′ and S′ to provide, at its output, signal M′·S′, a signal present only when neither signals M and S are received. Signal M′·S′ may be integrated as shown and applied to the receiver synchronizing and alarm circuits.

While the invention has been particularly shown and described with reference to preferred embodiments thereof, it will be understood by those skilled in the art that the foregoing and other changes in the form and details may be made therein without departing from the spirit and scope of the invention.

What is claimed is:

1. In an FSK receiver having mark and space channels each connected to an input of a decision bistable state circuit, means connected in the channels to provide signals for the decision circuit in the absence of either mark or space signals, comprising:

- a first circuit responsive to the mark signal to generate its complement;
- a second circuit responsive to the space signal to generate its complement;
- a first gate responsive to the mark signal and the complement of the space signal to generate a signal when either appears;
- a second gate responsive to the space signal and the complement of the mark signal to generate a signal when either appears;
- means to connect the output from said first gate to one input of the decision circuit;
- and
- means to connect the output from said second gate to the other input of the decision circuit.

2. The combination of claim 1 and

- pulse forming circuits connected to said first and second circuits responsive to the mark and space signals to generate pulse signals corresponding to the leading and trailing edges thereof.

3. The combination of claim 1 and

- a third gate connected to said mark and space channels and responsive to a coincidence of the mark and space signals to generate a signal corresponding to the simultaneous presence of both.

4. The combination of claim 1 and

- a fourth gate connected to said first and second circuits and responsive to a coincidence of the complements of the mark and space signals to generate a signal corresponding to the simultaneous absence of both.

5. In an FSK receiver incorporating a detector of transmitted mark and space frequency signals, a filter, a separate channel for each frequency signal and a bistable state circuit having an output representing the data contained in the FSK signal and a pair of inputs, a network connecting the channels with each input of the bistable state circuit, comprising:

- a first inverter connected to the mark channel;
- a second inverter connected to the space channel;
- a first pair of serially connected inverters connected to the mark channel;
- a second pair of serially connected inverters connected to the space channel;

a first OR circuit having its output connected to one input of the bistable state circuit and having a pair of inputs one connected to said first inverter and the other connected to said second pair of inverters; and a second OR circuit having its output connected to the other input of the bistable state circuit and having a pair of inputs one connected to said second inverter and the other connected to said first pair of inverters.

6. The combination of claim 5 and a first AND gate having a pair of inputs, one connected to each channel and an output signal representing the simultaneous presence of mark and space signals; and a second AND gate having a pair of inputs one connected to the first inverter in each of said pairs of serially connected inverters and an output signal representing the simultaneous absence of mark and space signals.

7. The combination of claim 6 and pulse forming circuits at each of the inputs to said first and second inverters and at each of the inputs to the last inverters of each of said first and second pairs of serially connected inverters.

8. The combination of claim 7 wherein said pulse forming circuits comprise differentiators.

References Cited

UNITED STATES PATENTS

| | | | |
|---|---|---|---|
| 3,238,459 | 3/1966 | Landee | 325—320 |
| 3,244,986 | 4/1966 | Rumble | 325—30 |

ROBERT L. GRIFFIN, *Primary Examiner.*

W. S. FROMMER, *Assistant Examiner.*